(12) United States Patent
Yazici et al.

(10) Patent No.: US 11,927,140 B1
(45) Date of Patent: Mar. 12, 2024

(54) GAS TURBINE ENGINE WITH GUIDED BLEED AIR DUMP

(71) Applicant: Raytheon Technologies Corporation, Farmington, CT (US)

(72) Inventors: Murat Yazici, Glastonbury, CT (US); Marc J. Muldoon, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/305,252

(22) Filed: Apr. 21, 2023

(51) Int. Cl.
*F02C 9/18* (2006.01)
*F02C 7/24* (2006.01)

(52) U.S. Cl.
CPC . *F02C 9/18* (2013.01); *F02C 7/24* (2013.01)

(58) Field of Classification Search
CPC ...... F02C 9/18; F02C 7/24; F02C 6/08; F02C 7/06; F01D 11/001; F01D 11/005; F01D 11/06; F01D 11/08
See application file for complete search history.

(56) References Cited

U.S. PATENT DOCUMENTS

| | | | |
|---|---|---|---|
| 7,249,929 B2 | 7/2007 | Cummings et al. | |
| 8,075,246 B2 | 12/2011 | Albert et al. | |
| 9,506,424 B2 | 11/2016 | Siering | |
| 11,473,497 B2 | 10/2022 | Schwarz | |
| 11,530,650 B2 * | 12/2022 | Galle | F02C 9/18 |
| 11,680,531 B2 * | 6/2023 | Hanlon | F02C 9/44 |
| | | | 60/785 |
| 11,713,722 B2 * | 8/2023 | Loebig | F02C 9/18 |
| | | | 60/39.092 |
| 2014/0109589 A1 * | 4/2014 | Pritchard, Jr. | F02C 6/08 |
| | | | 60/785 |
| 2015/0059315 A1 * | 3/2015 | Siering | F02K 3/075 |
| | | | 60/226.3 |
| 2016/0123235 A1 | 5/2016 | Siering et al. | |
| 2019/0055889 A1 * | 2/2019 | Heims | F04D 27/0215 |
| 2019/0368372 A1 * | 12/2019 | Le Marechal | F01D 17/141 |
| 2022/0412265 A1 * | 12/2022 | Nolan | B32B 3/12 |
| 2023/0220815 A1 * | 7/2023 | Ostdiek | F02K 3/02 |
| | | | 60/39.01 |

* cited by examiner

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

A gas turbine engine includes a propulsor delivering air into a core engine inward of an outer core panel. The core engine has a compressor section, a combustor and a turbine section. A compressor bleed system includes a bleed valve on a conduit communicating with compressed air from the compressor section. The bleed valve is configured to deliver air into a chamber where it can flow outwardly of the core engine at an exit location radially inward of the outer core panel.

15 Claims, 3 Drawing Sheets

GAS TURBINE ENGINE WITH GUIDED BLEED AIR DUMP

BACKGROUND OF THE INVENTION

This application relates to a compressor bleed air dump wherein the air is guided outwardly of a core housing.

Gas turbines engines are known and typically have a fan delivering air into a bypass duct as propulsion air and into a core engine. The core engine includes a compressor which compresses the air and delivers it into a combustor. The compressed air is mixed with fuel and ignited and products of that combustion pass downstream over turbine rotors driving them to rotate. The turbine rotors in turn drive compressor and fan rotors.

The operation of the compressor raises challenges. At times, particularly at startup of the engine, it is desirable to bleed air away from the compressor to maintain compressor stability.

Typically a valve is opened that communicates with the compressed air. The air is dumped outwardly of a housing of the core engine into the bypass duct.

Presently an outer panel provides an outer surface of the core housing. The bleed air is dumped into a chamber inward of the outer panel, and then through louvers in an outer peripheral surface of the outer panel into the bypass duct.

SUMMARY OF THE INVENTION

In a featured embodiment, a gas turbine engine includes a propulsor delivering air into a core engine inward of an outer core panel. The core engine has a compressor section, a combustor and a turbine section. A compressor bleed system includes a bleed valve on a conduit communicating with compressed air from the compressor section. The bleed valve is configured to deliver air into a chamber where it can flow outwardly of the core engine at an exit location radially inward of the outer core panel.

In another embodiment according to the previous embodiment, an inner core housing surrounds the compressor section and defines the chamber between the inner core housing and the outer core panel.

In another embodiment according to any of the previous embodiments, a flow guide member is positioned within the chamber to guide the bleed airflow from the valve to the exit location, and the flow guide member is received in the chamber. The flow guide member separates the chamber into a bleed air portion and a non-bleed air portion not receiving the bleed air.

In another embodiment according to any of the previous embodiments, there being at least one gas turbine engine accessory in the non-bleed air portion of the chamber.

In another embodiment according to any of the previous embodiments, the at least one accessory is an actuator for a variable vane.

In another embodiment according to any of the previous embodiments, a forward wall is positioned spaced from the flow guide member to define the bleed air path.

In another embodiment according to any of the previous embodiments, the forward wall is a firewall.

In another embodiment according to any of the previous embodiments, the flow guide member extends with a generally radially outwardly extending component and then turns at a radially outer location into a generally axially extending component until reaching the exhaust.

In another embodiment according to any of the previous embodiments, the compressor bleed system bleeds air from a midpoint between a low pressure compressor and a high pressure compressor in the compressor section.

In another embodiment according to any of the previous embodiments, an acoustic treatment is formed on an outer peripheral surface of the outer core panel.

In another embodiment according to any of the previous embodiments, a control selectively opening the bleed valve to allow air to bleed from the compressor section into the bleed airpath.

In another featured embodiment, a gas turbine engine includes a fan delivering air into a bypass duct defined by an outer fan housing and an inner core engine panel. The fan also delivers air into a core engine inward of the outer core panel. A compressor section receives air from the fan rotor, a combustor and a turbine section. A compressor bleed system includes a bleed valve on a conduit communicating with compressed air from the compressor section. The bleed valve is configured to deliver air into a chamber where it can flow outwardly into the bypass duct, with the air exiting the core engine at an exit location radially inward of the outer core panel.

In another embodiment according to any of the previous embodiments, an inner core housing surrounds the compressor section and defines the chamber between the inner core housing and the outer core panel.

In another embodiment according to any of the previous embodiments, a flow guide member is positioned within the chamber to guide the bleed airflow from the valve to the exit location, and the flow guide member is received in the chamber. The flow guide member separates the chamber into a bleed air portion and a non-bleed air portion not receiving the bleed air.

In another embodiment according to any of the previous embodiments, there being at least one gas turbine engine accessory in the non-bleed air portion of the chamber.

In another embodiment according to any of the previous embodiments, the at least one accessory is an actuator for a variable vane.

In another embodiment according to any of the previous embodiments, a forward wall is positioned spaced from the flow guide member to define the bleed air path In another embodiment according to any of the previous embodiments, the flow guide member extends with a generally radially outwardly extending component and then turns at a radially outer location into a generally axially extending component until reaching the exhaust.

In another embodiment according to any of the previous embodiments, the compressor bleed system bleeds air from a midpoint between a low pressure compressor and a high pressure compressor in the compressor section.

In another embodiment according to any of the previous embodiments, an acoustic treatment is formed on an outer peripheral surface of the outer core panel.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1A:
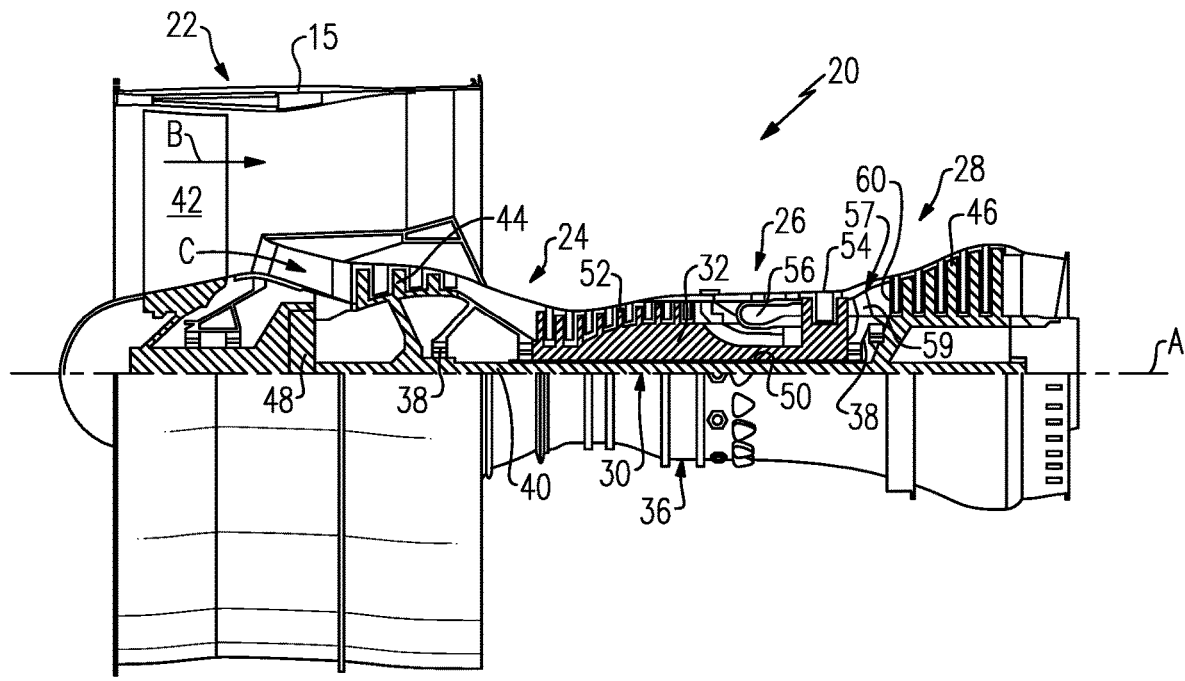
FIG. 1A schematically shows an engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 1B:
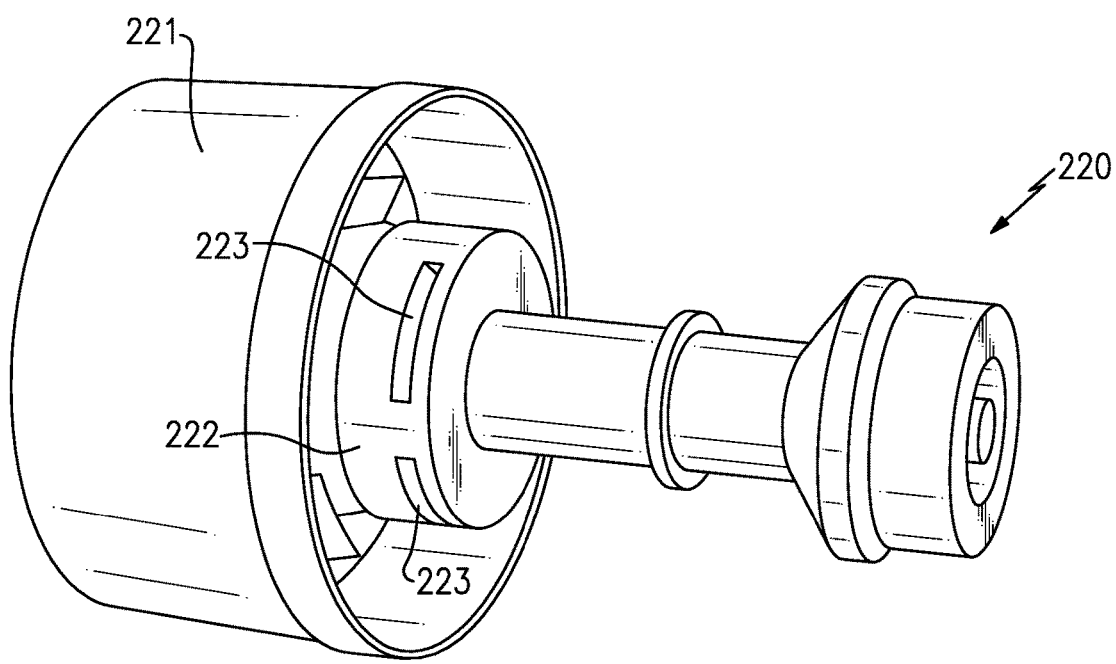
FIG. 1B shows a portion of an engine as known.

FIG. 1B shows a detail of a portion 220 of a prior art engine such as the engine shown in FIG. 1A. An outer panel 222 encloses a portion of the engine core. The fan case 221 is radially outwardly of that outer panel 222.

Louvers 223 are shown extending through the outer panel 222. Bleed air is dumped into a chamber inward of the outer panel 222 and then moves outwardly of the louvers 223 into the bypass duct.

The air freely flows within the relatively large chamber radially inward of the outer panel 222, and this raises challenges. As an example, dirt, icing and hail can be impacted on components which are housed in the chamber. Moreover, the louvers 223 make it difficult to provide treatment on the outer periphery of the panel 222. It may sometimes be desirable to provide an acoustic treatment, as an example, on the outer periphery of the panel 222 and this is difficult due to the louvers.

Figure 2A:
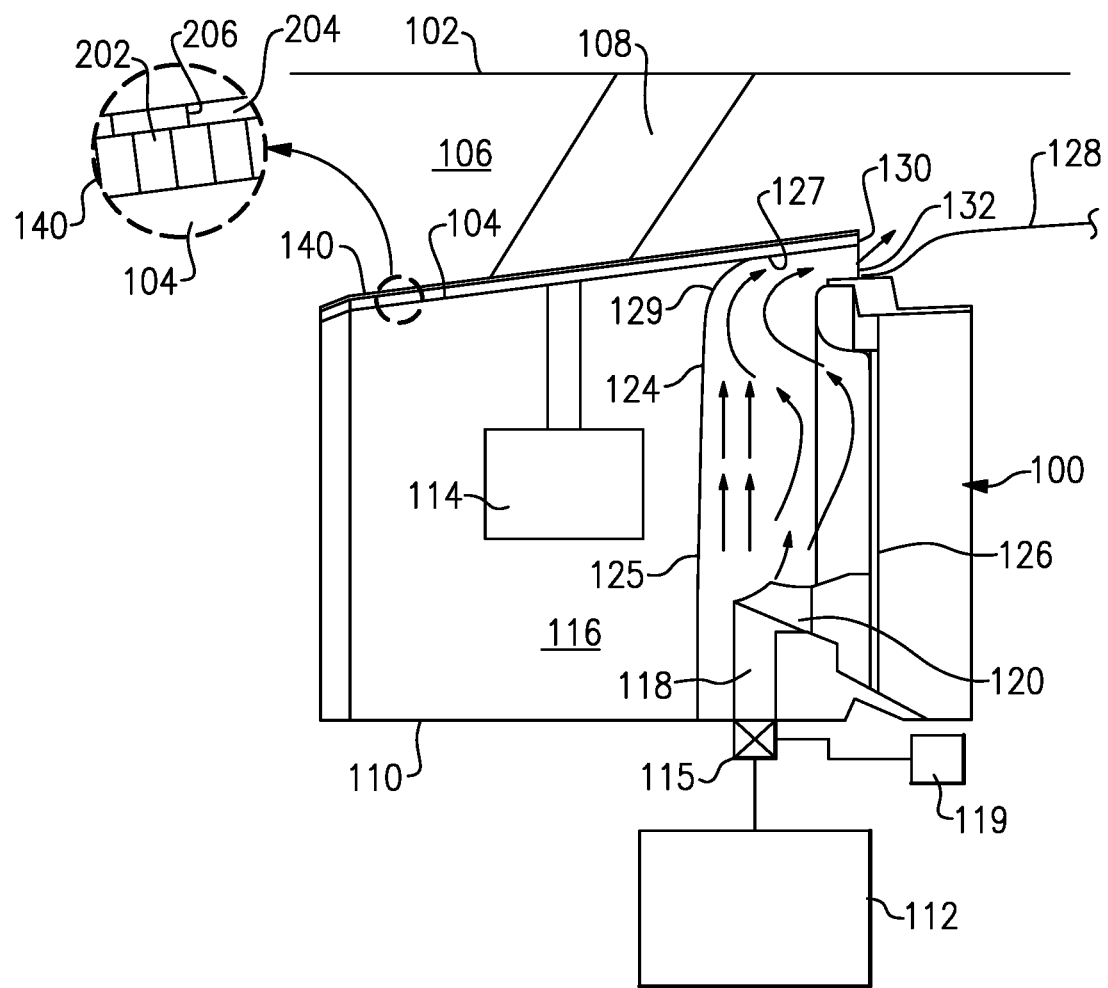
FIG. 2A shows a bleed air dump path.

FIG. 2A shows an improved bleed air dump 100. The fan housing 102 is shown outwardly of the outer panel 104. An inner core housing 110 is also shown. The bypass duct 106 is shown having fan exit guide vane 108. The fan exit guide vanes 108 could be variable such that an actuator 114 may change the orientation to control an air flow direction in the bypass duct 106. As shown, the actuator 114 is within a chamber 116 defined between the housings 104 and 110. A valve 115 is shown schematically communicating with a compressor housing 112. This may be a mid-compressor case intermediate a low pressure compressor and a high pressure compressor. As can be seen, the valve 115 and fan exit guide vane 108 are aft of a root of the fan exit guide vane 108.

Under certain conditions a control 119 opens the valve 115 to allow bleed of compressed air away from the compressor 112. This air flows radially outwardly into a path 118 defined by a guide panel 124 and a forward panel 126. In an embodiment the forward panel 126 may be a firewall. The firewall may be metal, composite, and/or other fire-resistant material.

In one embodiment, the valve 115 is opened at low pressure, such as start up, and closed at higher pressure. The operation and control of the bleed air valve may be as known in the art. It is the bleed airpath which is unique here. Control 119 may be a full authority digital electronic control ("FADEC") for the whole engine. Alternatively, it may be a stand-alone control.

Due to the guide panel 124 the air is isolated from the bulk of the chamber 116 such that challenges mentioned above do not impact the actuator 114 or other components which may be positioned in the chamber 116. The path 118 for the air moves outwardly of outlet 120 between panels 124 and 126. The air then moves radially outwardly such that it exits radially inwardly of a forward end 130 of the panel 104 and outwardly of exhaust 132 into the bypass duct 106.

As shown, the flow guide member 124 has a radially inner portion 125 which extends along a direction with a greater component in a radial direction than in an axial direction. The flow guide member 124 includes a turn 129 which turns the air in a more axial direction, and then along an inner surface 127 of the outer core panel 104 to guide the air to the exhaust or exit 132.

A housing 128 extends downstream of the exhaust 132 and provides the outer housing for the remainder of the core engine. Housing 128 may be part of the inner bypass duct, and could be fixed or it could be movable under certain conditions.

With the arrangement, the outer periphery of outer panel 104 is continuous and may be treated by surface treatments such as an acoustic treatment. Such a treatment is shown at 140 in FIG. 2A.

An example acoustic treatment is shown having chambers 202, that may be honeycomb shaped. Also a covering face plate 204 is over the chambers and has small perforations 206.

Figure 2B:
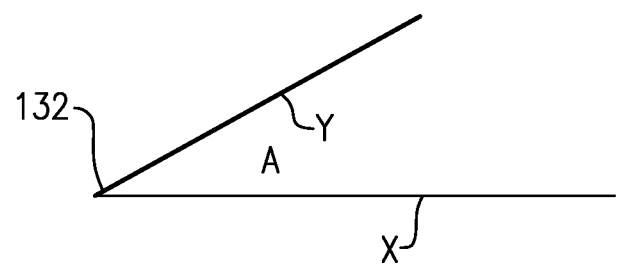
FIG. 2B shows a feature of the FIG. 2A dump path.

As shown in FIG. 2B, the direction of the exit air at exhaust 132 is generally in a direction Y which has an angle A with regard to a center axis X of the engine. The direction Y has a greater component in an axial direction than it does a radial direction. That is, the angle A is less than 45 degrees. Of course some airflow may have a greater angle. However, the direction at the end point 130 is generally axial.

Figure 3:
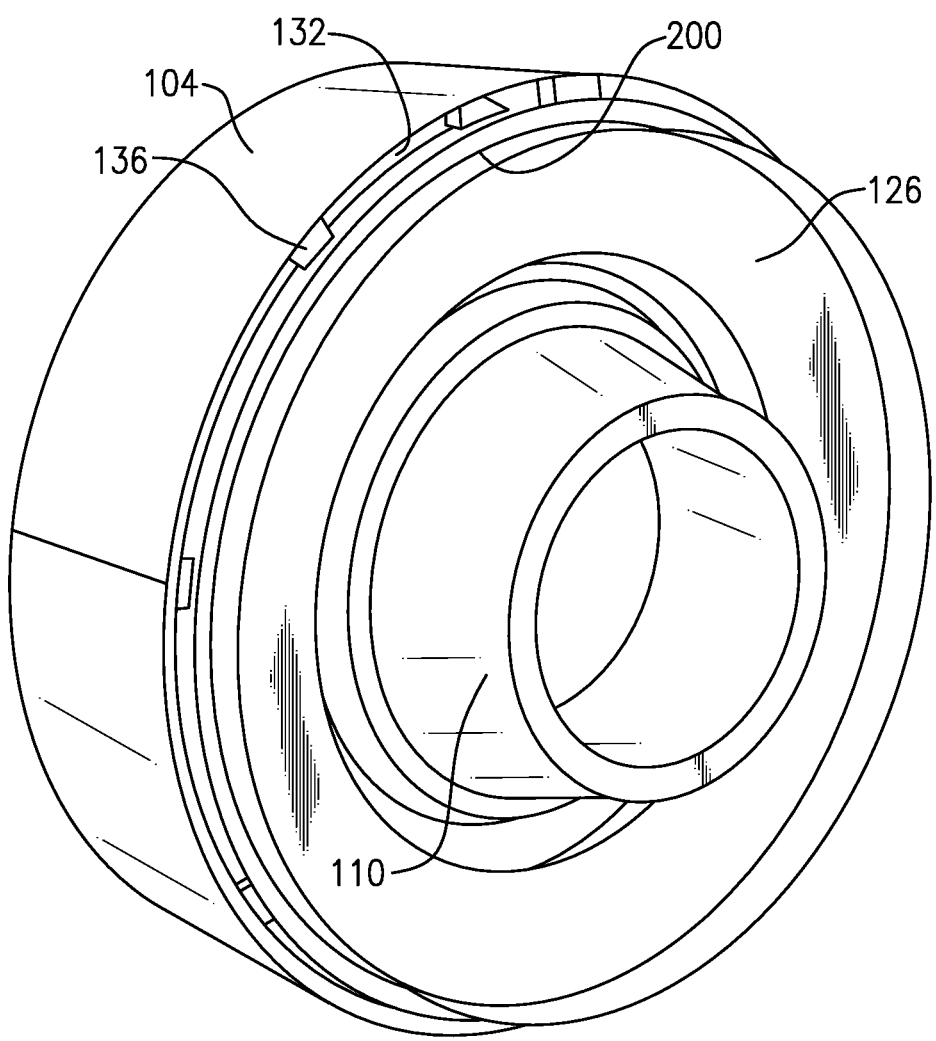
FIG. 3 is an end view of the structure shown in section in FIG. 2A.

FIG. 3 shows the panel 104 and the exit 132. The firewall 126 is shown spaced from the outer panel 104 to provide the exhaust 132. Spacers 136 are positioned periodically circumferentially to maintain the exhaust 132 open. Element 200 is an inner seal land.

A gas turbine engine under this disclosure could be said to include a propulsor delivering air into a core engine inward of an outer core panel. The core engine has a compressor section, a combustor and a turbine section. A compressor bleed system includes a bleed valve on a conduit communicating with compressed air from the compressor section. The bleed valve is configured to deliver air into a chamber where it can flow outwardly of the core engine at an exit location radially inward of the outer core panel.

While the feature is disclosed with a fan and the bleed air delivered into a bypass duct, it should be understood the base structure could be incorporated into an engine with a propeller, rather than a fan, as the propulsor.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A gas turbine engine comprising:
   a propulsor delivering air into a core engine inward of an outer core panel; the core engine having a compressor section, a combustor and a turbine section the compressor and turbine sections having rotors for rotating on an axis;
   a compressor bleed system comprising a bleed valve on a conduit communicating with compressed air from the compressor section, the bleed valve configured to deliver air into a chamber where the air can flow outwardly of the core engine at an exit location radially inward of the outer core panel;
   an inner core housing surrounds the compressor section and defines the chamber between the inner core housing and the outer core panel;
   a flow guide member is positioned within said chamber to guide the bleed airflow from the valve to the exit location, and the flow guide member received in the chamber, and separating the chamber into a bleed air portion and a non-bleed air portion not receiving the bleed air; and the flow guide member having a first portion extending from the inner core housing and along a direction with a greater component in a radial direction than in an axial direction, and the flow guide member then including a turn which turns the air in a more axial direction and then along an inner surface of the outer core panel to guide the air to the exit location.

2. The gas turbine engine as set forth in claim 1, further comprising at least one gas turbine engine accessory in the non-bleed air portion of the chamber.

3. The gas turbine engine as set forth in claim 2, wherein the at least one accessory is an actuator for a variable vane.

4. The gas turbine engine as set forth in claim 1, wherein a forward wall is positioned spaced from the flow guide member to define the bleed air path.

5. The gas turbine engine as set forth in claim 4, wherein the forward wall is a firewall.

6. The gas turbine engine as set forth in claim 1, wherein the compressor bleed system bleeds air from a midpoint between a low pressure compressor and a high pressure compressor in the compressor section.

7. The gas turbine engine as set forth in claim 1, wherein an acoustic treatment is formed on an outer peripheral surface of the outer core panel.

8. The gas turbine engine as set forth in claim 1, further comprising a control selectively opening the bleed valve to allow air to bleed from the compressor section into the bleed airpath.

9. A gas turbine engine comprising:
   a fan delivering air into a bypass duct defined by an outer fan housing and an outer core engine panel, the fan also delivering air into a core engine inward of an inner core engine panel; and a compressor section receiving air from said fan, a combustor and a turbine section the compressor and turbine sections having rotors for rotating on an axis;

a compressor bleed system comprising a bleed valve on a conduit communicating with compressed air from the compressor section, the bleed valve configured to deliver air into a chamber where the air can flow outwardly into the bypass duct, with the air exiting the core engine at an exit location radially inward of the outer core panel; wherein a flow guide member is positioned within said chamber to guide the bleed airflow from the valve to the exit location, and the flow guide member received in the chamber, and separating the chamber into a bleed air portion and anon-bleed air portion not receiving the bleed air, and having a first portion extending from the inner core panel and along a direction with a greater component in a radial direction than in an axial direction; and a fan exit guide vane on the outer core engine panel, and the bleed valve and the conduit are aft relative to the axis of the gas turbine engine relative to a root of the fan exit guide vane as connected to the outer core panel.

10. The gas turbine engine as set forth in claim 9, further comprising there being at least one gas turbine engine accessory in the non-bleed air portion of the chamber.

11. The gas turbine engine as set forth in claim 10, wherein the fan exit guide vane is a variable vane and the at least one accessory is an actuator for the variable vane.

12. The gas turbine engine as set forth in claim 9, wherein a forward wall is positioned spaced from the flow guide member to define the bleed air path.

13. The gas turbine engine as set forth in claim 9, wherein the compressor bleed system bleeds air from a midpoint between a low pressure compressor and a high pressure compressor in the compressor section.

14. The gas turbine engine as set forth in claim 9, wherein an acoustic treatment is formed on an outer peripheral surface of the outer core panel.

15. The gas turbine engine as set forth in claim 9, the flow guide member including a turn which turns the air in a more axial direction and then along an inner surface of the outer core panel to guide the air to the exit location.

* * * * *